March 4, 1952 W. T. O'NEIL 2,588,035
ELECTRONIC INDICATOR AND VIEWING MEANS FOR TWO VARIABLES
Filed Dec. 16, 1946 2 SHEETS—SHEET 1
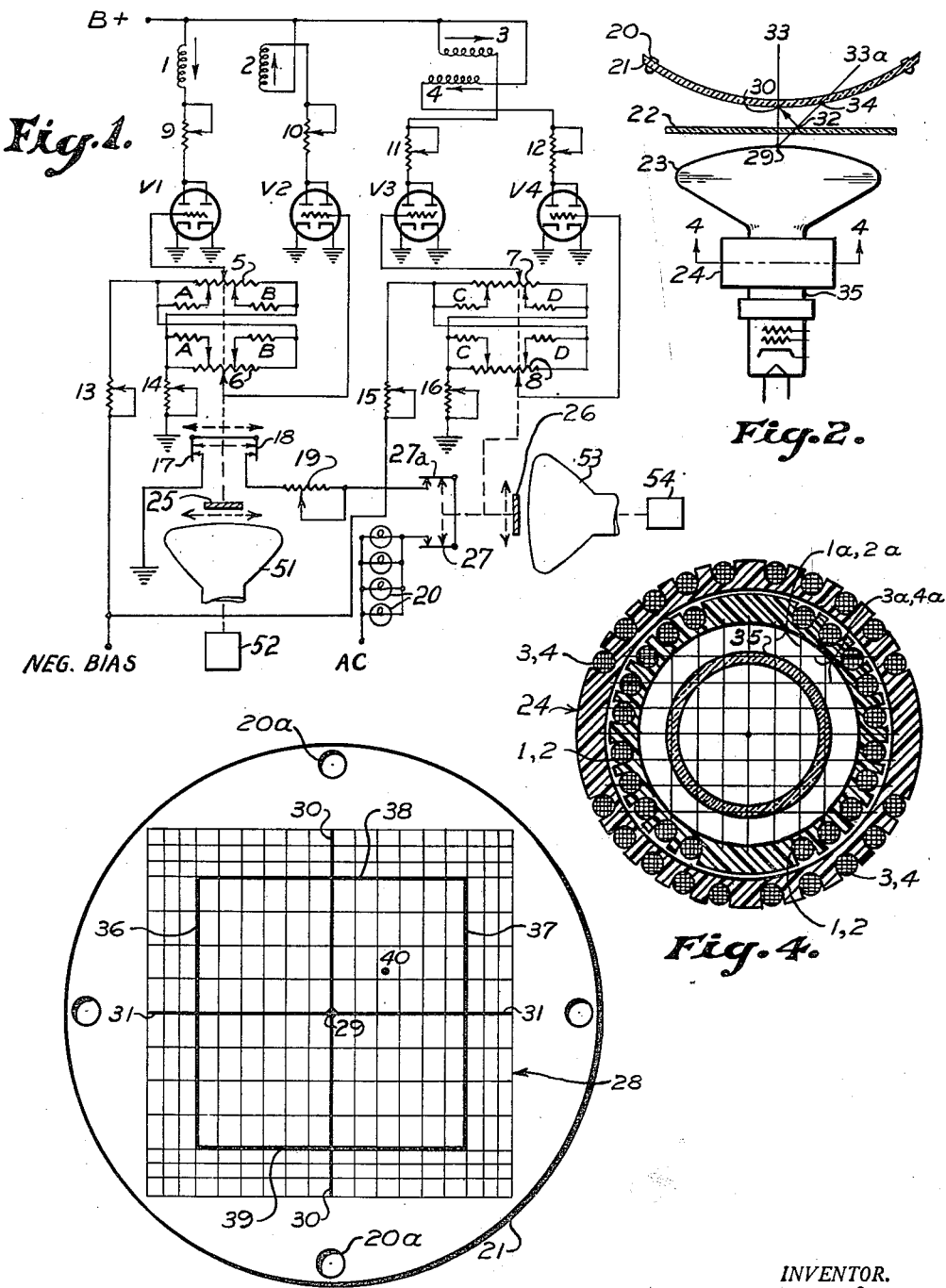
INVENTOR.
William T. O'Neil March 4, 1952 W. T. O'NEIL 2,588,035
ELECTRONIC INDICATOR AND VIEWING MEANS FOR TWO VARIABLES
Filed Dec. 16, 1946 2 SHEETS—SHEET 2

INVENTOR.
William T. O'Neil
BY
Berkeley & Saulsbury
Attys.

Patented Mar. 4, 1952

2,588,035

UNITED STATES PATENT OFFICE 2,588,035

ELECTRONIC INDICATOR AND VIEWING MEANS FOR TWO VARIABLES

William T. O'Neil, Glendale, Calif., assignor to Gilfillan Bros., Inc., Los Angeles County, Calif., a corporation of California Application December 16, 1946, Serial No. 716,535

14 Claims. (Cl. 343—10)

This invention has to do with the visual presentation in two dimensions of a variable position, error, or similar two dimensional quantity, when the information corresponding to the two coordinates is available separately, as in the form of rotational or longitudinal positions of mechanical parts.

My invention provides such a two-dimensional showing which responds without back-lash or other inaccuracy and without appreciable time delay to changes of position of the separately controlled elements whose positions correspond to momentary values of the two coordinates being represented. I make use of a conventional cathode ray tube with magnetic deflection, and provide electrical circuiting and other accessories, to be described.

My invention makes possible the representation of each coordinate near the center of the screen at a greater scale than near the edges, the position of the dividing line between the greater and the smaller scale being separately adjustable on each side of the center of the screen and for each coordinate. Moreover the electric circuit, according to my invention, is remarkably free from electrical drift, insuring a stable representation without requiring frequent adjustment. It also provides convenient adjustments for re-establishing scale factors, centering, etc., so that the cathode ray tube can be changed when necessary with a minimum interruption to operation.

My invention also includes a novel means of providing an illuminated scale separate from the face of the cathode ray tube, but so designed that there is no parallax error in reading the position of the beam with relation to the scale even when the observer's eye is not directly in front of the tube.

When the error of position, bearing or other quantity indicated on the cathode ray screen departs from the calibrated limits of this screen my invention further provides for the automatic indication to the observer that this is the case. This enables the operator to distinguish with certainty between normal disappearance of the beam image and that caused by possible failure of the equipment.

A typical application of my electronic error indicator is in connection with a radar aircraft landing aid system, and the following detailed description of an illustrative embodiment of my invention will refer to this particular application. However, neither this fact nor the particular embodiment described is intended as a limitation upon the scope of my invention. This illustrative description is to be read in conjunction with the attached figures, of which Fig. 1 is a schematic diagram of an electric circuit in accordance with my invention;

Fig. 2 is a schematic view transverse to the axis of a cathode ray tube such as is used in my invention, showing in section the separate scale and mirror by which I eliminate parallax;

Fig. 3 shows the calibrated scale as it appears in front of the cathode ray tube screen;

Fig. 4 is a cross section of the cathode ray tube taken on line 4—4 of Fig. 2, and showing the construction of the deflection coils;

Figure 5:
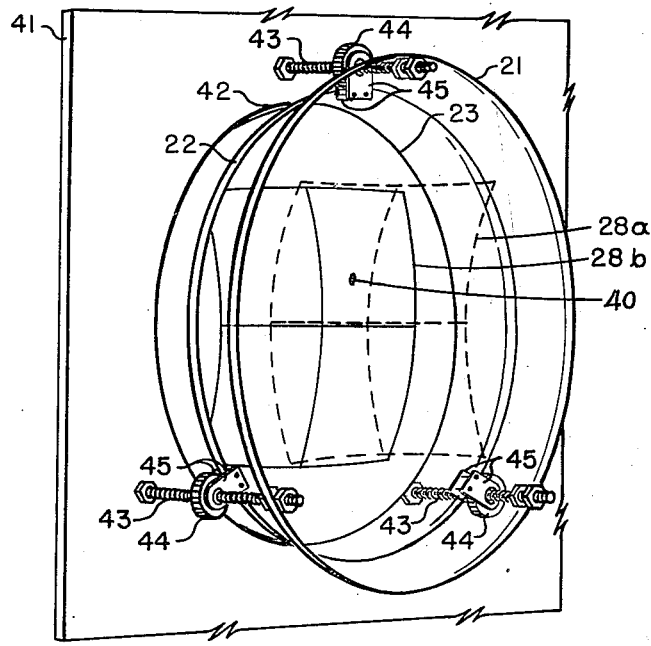
Fig. 5 is a perspective view showing preferred means of mounting the calibrated scale and mirror in front of the cathode ray tube.

In the radar aircraft landing aid system referred to above, two precision radar systems are set up in definite positions near the landing strip and show the azimuth and altitude, respectively, of a landing aircraft upon the screens of separate cathode ray tubes, the angle and range being indicated in each instance by the position of a bright spot on the screen. Associated with each radar screen is a transparent scale upon which is marked out the proposed glide path for the aircraft, in azimuth and in elevation respectively. Each screen is observed by an operator, who adjusts a cursor in accordance with the observed motion of the bright spot. The cursor is essentially a transparent strip carrying a straight center line which crosses the face of the radar screen parallel with the center line of the glide path and normally coinciding with this line, but so mounted that it can be moved transversely. When the center line of the cursor intersects the bright spot, its distance from its normal position corresponds to the distance of the aircraft from the center of the predetermined glide path (either in azimuth or in elevation). In fact the departure of the cursor from its normal position is directly proportional to the error in feet of the aircraft from its correct position at any moment. The general purpose of my invention, with specific reference to this use, is to combine the two separate components of the aircraft position error, as represented by the two independent cursor positions, in a single convenient showing visible to a third operator, who can then inform the pilot by radio telephone of the size and direction of his error and of the change in course which will correct it. A preferred form of this presentation is shown in Fig. 3, in which the momentary position of the cathode ray beam image 40 represents the aircraft position and the network of lines 28 form calibrated scales with the central point 29 representing the axis of the selected glide path. The departure of 40 from 29 shows the pilot's error at any moment, the horizontal component of the displacement giving the azimuth error and the vertical component giving the elevation error. By this integration of the information obtained from the two precision radar systems into a single showing, the third operator is enabled to see the complete situation at a glance, thus avoiding confusion and delay in relaying information to the pilot.

Motion of the azimuth cursor is made to control the electric current through the horizontal deflection coils of the cathode ray tube; and motion of the elevation cursor is made to control the current in the vertical deflection coils of the cathode ray tube. The circuits by which this is accomplished are shown schematically in Fig. 1, the left hand side of the figure showing the azimuth control circuit, and the right hand portion showing the essentially identical elevation circuit. The cathode ray tube associated with the azimuth radar system is indicated at 51 with the system proper, which may be of any suitable type, indicated schematically at 52. The azimuth cursor 25 is mounted, as indicated by the dashed arrow, for movement across the cathode ray screen of tube 51. The cathode ray tube of elevation radar system 54 is similarly shown at 53, with the elevation cursor 26 movable across its screen. The difference of position of cathode ray tubes 51 and 53 in Fig. 1 represents their association with azimuth and elevation coordinates, respectively, but does not necessarily correspond to the actual physical position of those tubes.

The azimuth deflection coils are indicated in Figs. 1 and 4 at 1 and 2. These two coils contain the same number of turns and are wound throughout by parallel strands of wire, so that physically they form a single coil. This is constructed upon a cylindrical phenolic form, shown in section in Fig. 4 and in typical relation to the cathode ray tube in Fig. 2 at 24. This form is mounted coaxially with the cathode ray tube, indicated at 35, in such a way that the axis of coils 1 and 2 is vertical as seen in Fig. 4, intersecting the tube axis normally. The lines of magnetic force produced by currents in coils 1 and 2 will then pass through tube 35 approximately as indicated by lines 1a, 2a in Fig. 4, so that electrons traveling generally along the tube axis will tend to be deflected horizontally to one side.

The two altitude deflection coils 3 and 4 are similarly wound in parallel on a similar cylindrical phenolic form, which is coaxially related to the tube 35 (Fig. 4) so that the coil axis is horizontal and intersects the tube axis at right angles. Currents through coils 3, 4, result in a magnetic field oriented as indicated by lines 3a, 4a in Fig. 4, tending to deflect the cathode ray beam upward or downward.

The reason for using two azimuth coils 1 and 2 (and similarly two elevation coils 3 and 4) is to avoid fluctuations and drift of the cathode ray beam due to variations in voltage, temperature, etc. As is indicated in Fig. 1, coils 1 and 2 are so connected that the normal direction of current flow in them is opposite. Thus at some particular, approximately equal, values of the currents through the two coils, their magnetic fields will cancel and cause no deflection of the electron beam. Rheostats 9 and 10, in series with coils 1 and 2, respectively, permit convenient adjustment of the relative current through the two coils, and thus provide a zero adjustment for the tube. The amplifying electronic tubes V1 and V2 are also connected in series with coils 1 and 2, respectively, so that current flowing through the coils from a positive voltage supply B+ to ground is controlled by the grid potentials of these tubes. The grid potentials are obtained from the movable contacts of potentiometers 5 and 6, respectively, which are connected in parallel between ground and a source of negative bias voltage, as indicated in Fig. 1. Between the two potentiometers 5 and 6 and the source of bias voltage is connected the variable resistance 13, and the variable resistance 14 is similarly connected between the potentiometers and ground.

The contacts of potentiometers 5 and 6 are mechanically linked together, as indicated by the dashed line in Fig. 1, and are moved in unison in accordance with the motion of the azimuth cursor 25 by any suitable linkage device, mechanical or otherwise. This is indicated schematically in Fig. 1 by a dashed line. However, it will be noted that potentiometers 5 and 6 are oppositely connected electrically, so that as azimuth cursor 25 is moved to the left, for example, the grid of tube V1 becomes more negative and that of V2 more positive. Thus the current through coil 1 will be increased and that through coil 2 will be decreased, destroying the normal balance between the two magnetic fields and causing deflection of the electron beam to the right or to the left, according to the detailed connections of the coil. Similarly, motion of azimuth cursor 25 to the right makes the grid of tube V1 more positive and that of V2 more negative, causing a deflection of the electron beam in the opposite direction.

Provided that the total range of grid voltage obtainable from potentiometer 5 falls within the linear portion of the characteristic curve of tube V1, and similarly that the entire range of grid voltage obtainable from potentiometer 6 falls within the linear portion of the curve of tube V2, the difference in current between coils 1 and 2, and hence the electron beam deflection, will be closely proportional to the deflection of the potentiometer contacts and hence of the azimuth cursor 25 from its normal position. These conditions can be met by adjustment of rheostats 13 and 14, the setting of 13 controlling primarily the potential at the most negative ends of potentiometers 5 and 6, and the setting of 14 determining primarily the potential at the least negative ends of both potentiometers. Rheostats 13 and 14 together control the total voltage range of potentiometers 5 and 6, and thus determine the magnitude of the electron beam deflection when contacts 5 and 6 are both moved to the extreme left or both to the extreme right. The setting of rheostats 13 and 14 therefore determines the sensitivity of the beam deflection, that is, the factor of proportionality between the linear motion of the azimuth cursor and the horizontal beam deflection observed on the cathode ray screen.

The shunting resistors A and B are variably tapped near the ends of potentiometers 5 and 6, serving to decrease the resistive gradient of said potentiometers from the points of tapping outward to their ends. That is, motion of the potentiometer contact through a given distance within the end portion of the potentiometer will result in a smaller change of grid voltage than in the central portion. This leaves the full deflection sensitivity near the center of the cathode ray screen where high accuracy is desirable, but produces a more condensed scale near the edges of the screen, thus permitting a wider range of azimuth error to be displayed upon a screen of given size. The positions on the screen at which this change of scale takes place (lines 36 and 37 in Fig. 3) are determined on one side of the screen by the points at which resistors A are tapped to potentiometers 5 and 6, and on the other side of the screen by the points at which resistors B are tapped to the potentiometers. The amount by which the scale is changed on one side depends upon the relation between resistances A and the parts of the potentiometers with which they are in parallel; similarly the relation between resistances B and the parts of the potentiometers with which they are in parallel determines the change of scale on the other side of the screen. Preferably the two resistances A are adjusted as nearly identically as is practicable both as to their resistances and as to the points at which they are tapped into their respective potentiometers; the same applies to the two resistances B.

The elevation deflection control circuit, shown in the right hand portion of Fig. 1, will be seen to be closely similar to that already described for the azimuth control circuit. The current through elevation coils 3 and 4 is controlled by series resistances 11 and 12 respectively, giving a centering adjustment, and also by amplifying tubes V3 and V4 respectively. The grid potentials of these tubes are controlled by potentiometers 7 and 8, which are mechanically linked together and to elevation cursor 26, as indicated schematically by a dashed line. The elevation deflection sensitivity in the large scale central region of the screen is controlled by resistors 15 and 16; and near the edges of the screen the sensitivity is controlled also by the shunting resistors C and D, in the same way as was described above for the azimuth control circuit.

Fig. 3 represents a typical calibrated grid scale 28, placed over the screen of the cathode ray tube. The various adjustments described in connection with Fig. 1 must be set in such a way that as the azimuth and elevation cursors 25 and 26 are moved with respect to the center line of the glide path, the position of spot 40 relative to calibrated scale 28 will correctly represent the distance of the aircraft from the ideal predetermined glide path (point 29) in azimuth and in elevation. With both cursors in their normal positions resistances 9 and 10 are so adjusted that spot 40 falls on the vertical center line 30 of scale 28, and resistances 11 and 12 are so adjusted that it falls upon horizontal center line 31, thus bringing it to the center of the entire scale at 29. When the azimuth cursor 25 is moved a certain distance spot 40 can be made to move a corresponding distance relative to scale 28 by adjustment of resistances 13 and 14. The points at which shunting resistances A are variably tapped on potentiometers 5 and 6 are adjusted to coincide with those positions of the potentiometer contacts for which spot 40 lies on line 36 (say) of scale 28, so that the change of scale caused by the shunting resistances will take place at this line; and shunting resistances B are similarly adjusted with respect to scale line 37. The magnitudes of shunting resistances A and also of shunting resistances B can be selected or adjusted to give the desired degrees of condensation of scale, which appear in grid 28 outside of lines 36 and 37, respectively. In the elevation control circuit shunting resistances C and D may similarly be adjusted to give the desired change of scale occurring at the lines 38 and 39.

If the error in position of the aircraft exceeds the limits corresponding to the screen of the cathode ray tube it is desirable to give the operator automatic indication to this effect, so that he will know that the disappearance of the beam image 40 is not due to tube failure. This information is conveyed, according to my invention, by automatically turning off the lamps 20 which illuminate scale 28 (see below). This is accomplished by linking azimuth cursor 25 with the limit switches 17 and 18 by any suitable means, indicated in Fig. 1 by dashed lines, so that the motion of the cursor to the left beyond some definite positions of potentiometers 5 and 6 will open switch 17 and its similar motion to the right will open switch 18. Similarly elevation cursor 26 is linked to switches 27 and 27a. The potentiometer positions at which the limit switches are set to open can be made to correspond to any desired distance of spot 40 from the center 29 of screen 28. The four limit switches 17, 18, 27 and 27a are connected in series with lamps 20 which illuminate scale 28, so that if any one of the switches is opened as described above these lamps will be temporarily turned off. This informs the operator that the error in position of the aircraft exceeds the limits of scale 28 (or exceeds whatever other limit may be determined by the setting of the limit switches), and he is thus able to inform the pilot accordingly.

Figure 6:
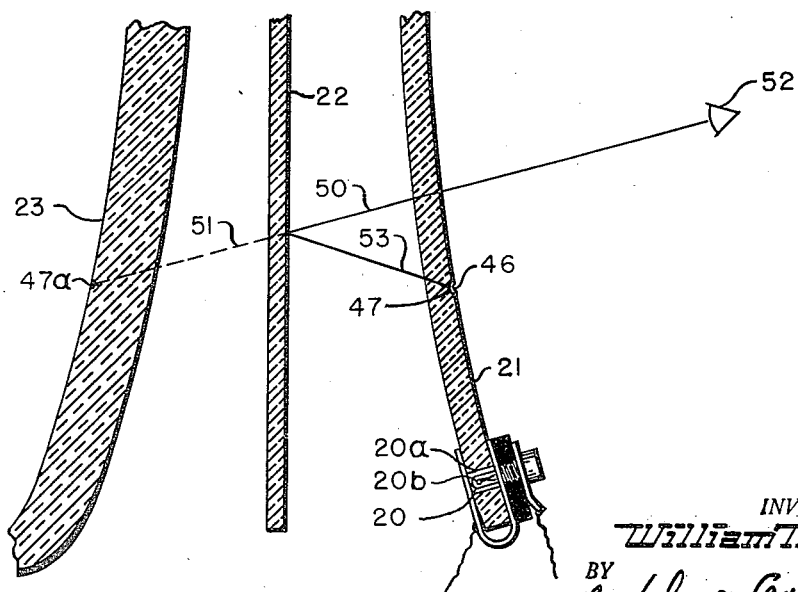
Fig. 6 is a fragmentary schematic diagram showing the construction of my calibrated scale, and indicating light paths associated therewith.

Since the position of spot 40 is to be read with relation to calibrated scale 28, a serious error may be made due to parallax whenever the observer's eye is not directly in front of the screen unless the fluorescent screen surface and the calibrated scale are in the same plane. It would therefore be desirable, if it were possible, to locate the scale physically in the same plane with the fluorescent screen on the inner surface of the cathode ray tube. This difficulty is overcome according to my invention by locating the screen a convenient distance in front of the tube and observing it in a mirror which is so placed between it and the tube that the scale is made to appear to lie in the surface of the tube screen. This is accomplished, for example, as indicated in Figs. 2, 5 and 6, by mounting directly in front of the cathode ray screen 23 a plane mirror 22 and a curved transparent scale plate 21 whose curvature is everywhere equal and opposite to that of the screen 23. Scale plate 21 and mirror 22 must be so adjusted that each point of the scale lies substantially the same optical distance in front of the mirror that the corresponding point of the screen lies behind the mirror. Bearing in mind that screen 23 might be flat or substantially flat (although usually curved) the adjusted positions of the parts may be described by saying that screen 23 and plate 21 lie in opposition in generally parallel planes, with mirror 22 approximately equidistant between them. This adjustment is conveniently made if the scale plate and screen are so mounted as to be individually adjustable in angle and in distance from the face of cathode ray tube 23. For example, the screws 43 can be rigidly mounted in the front panel 41 of the cathode ray tube case (Fig. 5) and the optical parts mounted by means of brackets 45 slidably adjusted on the screws by thumb nuts 44 (as shown for mirror 22); or the brackets may be replaced by holes drilled directly in the optical parts to take the screws 43 (as shown for scale plate 21). The scale lines are physically formed on the plate 21 by being engraved in the front surface of the scale plate as illustratively shown at 47 in Fig. 6. In Fig. 5 the engraved lines are indicated schematically by the dashed lines 28a, while the virtual image of the scale as seen reflected in mirror 22 is indicated by the solid lines 28b. This image coincides exactly with the curved screen surface 23. The eye may then be moved freely from side to side in front of the tube, even as far as to the viewpoint from which Fig. 5 is drawn, without causing any apparent relative motion of spot 40 on the cathode ray screen 23 and the image 28b of scale 28a engraved on plate 21. By using a partially reflecting mirror 22 with a reflectivity in the neighborhood of 20%, the reflected image of scale 28 is made satisfactorily bright without cutting down excessively the brightness of spot 40, which must be observed through the mirror.

Although the curvature of the scale plate is ideally equal and opposite to that of the tube screen, the optical functions described above are sufficiently well performed in ordinary practice if the curvatures are approximately equal. Thus, for example, if the tube screen is ellipsoidal the scale plate may satisfactorily be of spherical form; or, if the curvature of the tube screen is not too great, the scale plate may be flat.

To make the lines of scale 28 clearly visible I engrave them into the surface of a polished transparent plate, preferably of plastic, and properly curved as described above; and I provide illumination from small incandescent lamps 20 which are set into holes 20a in the transparent scale plate, as indicated in Fig. 2 and at larger scale in Fig. 6, so that their filaments 20b lie between the front and back surfaces of the plate. Light from these lamps enters the body of the plate through the walls of holes 20a, and is largely prevented from escaping through its polished surfaces by total reflection. However, the rough surfaces of the engraved scale lines 47 scatter the light, making the lines clearly visible. Although the line surfaces are preferably rough so that they scatter the light diffusely, this is not necessary, since the lines are illuminated over an appreciable solid angle by the light internally reflected within the plate. The apparent brightness of the lines can be adjusted conveniently by means of rheostat 19 (Fig. 1) in series with the lamps 20.

It is desirable to prevent the scale lines from being observed directly, so that they will be visible only by reflection in mirror 22. Thus the dashed lines 28a of Fig. 5 will not be visible, and only solid lines 28b will be seen. I accomplish this as indicated in Fig. 6 by filling the rough engraved lines 47 first with a layer of white, then with a layer of black paint 46. Such a formation forms a substantive line which is highly diffusively reflective on its surface facing the mirror but is quite completely opaque. The opaque line thus formed is so narrow that it forms only a negligible obstruction to seeing the cathode ray screen and the scale image 28b. If the operator's eye is, for example, at 52, he will see line 47 by means of light which follows a path 53 to the mirror surface 22 and is then reflected along 50 to his eye. The apparent position of line 47 will then be at 47a, where the path 51 is of the same optical length as 53 and makes the same angle with the mirror surface 22. The small incorrection which results from path 51 passing through the glass of mirror 22 and of the tube wall 23 is negligible.

Except for such minor incorrections, the apparent position of 47a is independent of the eye position 52. The scale pattern therefore appears to lie in the surface 23 where it coincides with the fluorescent screen of the cathode ray tube, and to remain fixed in that surface as the eye is moved to any reasonable distance from the tube axis.

I claim:

1. In systems for the electronic indication of a variable quantity, the combination of a cathode ray tube having a curved fluorescent screen, circuit means for generating a voltage proportional to the variable quantity, ray deflection means associated with the tube and utilizing the variable voltage for proportionately deflecting the cathode ray, a curved transparent plate opposed to the tube screen in spaced relation, the curvature at each point of the plate being approximately equal and opposite to the curvature at the corresponding opposing point of the tube screen, a plane semi-transparent mirror between and approximately equidistant from the plate and the tube screen, scale indications on the plate, and illuminating means for the scale indications.

2. In systems for the electronic indication of a variable quantity, the combination of a cathode ray tube having a fluorescent screen, circuit means for generating a voltage proportional to the varying quantity, said circuit means including associated circuit means for changing the factor of proportionality for values of the variable beyond a predetermined value, ray deflection means associated with the tube and utilizing the variable voltage for proportionately deflecting the cathode ray, and a scale associated with the tube screen and having two parts of different factors of calibration corresponding respectively to the two different factors of proportionality represented by the generated voltage.

3. Means for viewing the position of an indicating element which moves in a curved surface, comprising a curved transparent plate opposed to the curved surface in spaced relation, the curvature at each point of the plate being approximately equal and opposite to the curvature at the corresponding opposing point of the curved surface, a plane semi-transparent mirror between and approximately equidistant from the plate and the curved surface, scale indications on the plate, and illuminating means for the scale indications.

4. Viewing means for the screen of a cathode ray tube or the like, comprising, in combination with such screen, a transparent plate which carries scale indications spaced from and in general parallelism with the screen, a semi-transparent mirror between and approximately equidistant from the scale plate and the screen in position to reflect light from the scale indications through the transparent scale plate, the scale indications on the scale plate being formed of engraved lines in the surface of the plate away from the mirror, and of fillings in the engravings comprising a first layer of relatively reflective material substantially covering the walls of the engraved lines and a second layer of relatively non-reflective material covering the first layer, and means to illuminate the scale plate internally from an edge of the plate.

5. In radar landing aid systems which embody movable elements adapted to follow and indicate the altitude and azimuth factors of the position of an airplane, an electronic system for the visual presentation of the position indicated by said factors, comprising the combination of, two circuit means associated respectively with the two movable elements, each circuit means adapted to generate a voltage which is proportional to the displacement of its respective element from a predetermined position, a cathode ray tube, two sets of ray deflection means associated with the tube utilizing respectively the two varying voltages to laterally deflect the cathode ray in two coordinates, and a scale associated with the cathode ray screen and carrying scale indications in those coordinates, the scale indications being carried by a plate and being spaced from and in general parallelism with the cathode tube screen, and a semi-transparent mirror located approximately equidistantly between the screen and scale plate.

6. A visual presentation system as defined in claim 5, the scale indications being formed on the surface of the scale plate away from the mirror and comprising substantive lines of an opaque substance having a reflective surface facing the mirror.

7. A visual presentation system as defined in claim 5, the scale indications being formed on the surface of the scale plate away from the mirror and comprising substantive lines of an opaque substance having a diffusively reflective surface facing the mirror, and electric lamp means for illuminating the transparent scale plate internally.

8. In a system adapted for electronic indication of a variable quantity and including a cathode ray tube having a fluorescent screen and ray deflection means, and means for generating a voltage proportional to the variable quantity, the said ray deflection means utilizing the variable voltage for proportionately deflecting the cathode ray; means for indicating whether the variable quantity exceeds a predetermined limit and acting independently of the presence of the cathode ray image on the screen, said means comprising a plate carrying scale indications in optical superposition upon the tube screen in positions corresponding to predetermined values of the variable quantity, illuminant means for the scale indications, illuminant control means and means for actuating the illuminant control means in definitely predetermined relation to changes in the variable quantity to disable the said illuminant means when the variable quantity exceeds the predetermined limit.

9. In a system adapted for electronic indication of a variable quantity and including a cathode ray tube having a fluorescent screen and ray deflection means, and means for generating a voltage proportional to the variable quantity, the said ray deflection means utilizing the variable voltage for proportionately deflecting the cathode ray; means for indicating whether the variable quantity exceeds a predetermined limit and acting independently of the presence of the cathode ray image on the screen, said means comprising a plate carrying scale indications and spaced from the tube screen, illuminating means, including an electric lamp, for rendering the scale indications visible, optical imaging means for bringing the scale indications and the tube screen into apparent substantial coincidence, a lamp energizing circuit including a switch, and switch actuating means acting in definitely predetermined relation to changes in the variable quantity to open the switch when the variable quantity exceeds the predetermined limit.

10. In a two coordinate radar system which includes two cathode ray tubes and associated circuitry whereby information relating to the two coordinates is displayed on the screen of the respective tubes; means for displaying on a third cathode ray tube information relating to both coordinates, said means comprising two elements movable respectively across the screens of the said two cathode ray tubes in accordance with the information displayed thereon, two circuit means acting respectively in response to movements of the two movable elements to generate voltages which vary in accordance with the positions of the respective elements, and two sets of ray deflection means for the said third cathode ray tube and utilizing respectively the two varying voltages to laterally deflect the cathode ray of that tube in two coordinates.

11. In a radar landing aid device which includes two radar systems having respective antennas and cathode ray tubes, said radar systems scanning respectively in azimuth and in elevation and indicating azimuth and elevation coordinates of an airplane on the respective screens of the two cathode ray tubes; means for indicating the said azimuth and elevation coordinates on the screen of a third cathode ray tube, said means comprising two elements movable respectively across the screens of the said two cathode ray tubes in accordance with the indications thereon, two circuit means acting respectively in response to movements of the two movable elements to generate voltages which vary in accordance with the positions of the respective elements, and two sets of ray deflection means for the said third cathode ray tube and utilizing respectively the two varying voltages to laterally deflect the cathode ray of that tube in two coordinates, and a scale in visual proximity to the third cathode ray screen and carrying scale indications in those coordinates.

12. In a radar landing aid device which includes two radar systems having respective antennas and cathode ray tubes, said radar systems scanning respectively in azimuth and in elevation and indicating azimuth and elevation coordinates of an airplane on the respective screens of the two cathode ray tubes; means for indicating on the screen of a third cathode ray tube variations of both the said azimuth and elevation coordinates, said means comprising two elements movable respectively across the screens of the said two cathode ray tubes in accordance with the indications thereon, two circuit means acting respectively in response to movements of the two movable elements to generate voltages which vary in accordance with the displacements of the respective elements from a predetermined position, two sets of ray deflection means for the said third cathode ray tube and utilizing respectively the two varying voltages to laterally deflect the cathode ray of that tube in two coordinates, and a scale in visual proximity to the third cathode ray screen and carrying scale indications in those coordinates representing predetermined increments of azimuth and elevation respectively.

13. A visual presentation system as defined in claim 10, and including also illuminating means for the scale indications, said illuminating means including switching means responsive to the positions of the two movable elements and acting to deenergize the illuminating means when either of the elements moves beyond a predetermined limit.

14. A visual presentation system as defined in claim 10, and including also illuminating means for the scale indications, said scale indications being carried by a transparent plate spaced from and in general parallelism with the cathode tube screen, and there being a semi-transparent mirror located approximately equidistantly between the screen and scale plate, said illuminating means including switching means responsive to the positions of the two movable elements and acting to deenergize the illuminating means when either of the elements moves beyond a predetermined limit.

WILLIAM T. O'NEIL.

REFERENCES CITED

The following references are of record in the file of this patent:

UNITED STATES PATENTS

| Number | Name | Date |
| --- | --- | --- |
| 1,924,156 | Hart | Aug. 29, 1933 |
| 2,231,929 | Lyman | Feb. 18, 1941 |
| 2,251,984 | Cleaver | Aug. 12, 1941 |
| 2,408,848 | Hammond | Oct. 8, 1946 |
| 2,419,205 | Feldman | Apr. 22, 1947 |
| 2,427,905 | Fyler | Sept. 23, 1947 |
| 2,438,112 | Darlington | Mar. 23, 1948 |
| 2,446,674 | Sproul | Aug. 10, 1948 |